(12) United States Patent
Yamamoto

(10) Patent No.: US 11,314,615 B2
(45) Date of Patent: Apr. 26, 2022

(54) RECORDING MEDIUM AND INFORMATION PROCESSING APPARATUS

(71) Applicant: FUJITSU LIMITED, Kawasaki (JP)

(72) Inventor: Masao Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 329 days.

(21) Appl. No.: 16/708,483

(22) Filed: Dec. 10, 2019

(65) Prior Publication Data

US 2020/0201738 A1    Jun. 25, 2020

(30) Foreign Application Priority Data

Dec. 20, 2018  (JP) .............................. JP2018-238854

(51) Int. Cl.
| | | |
|---|---|---|
| G06F 11/34 | (2006.01) | |
| G06F 11/30 | (2006.01) | |
| G06F 17/18 | (2006.01) | |
| G06F 9/455 | (2018.01) | |

(52) U.S. Cl.
CPC ...... G06F 11/3419 (2013.01); G06F 9/45558 (2013.01); G06F 11/301 (2013.01); G06F 11/3006 (2013.01); G06F 17/18 (2013.01); G06F 2009/45591 (2013.01); G06F 2009/45595 (2013.01)

(58) Field of Classification Search
CPC ............. G06F 11/0712; G06F 11/0751; G06F 11/301; G06F 11/302; G06F 11/3006; G06F 11/3412; G06F 11/3452; G06F 11/3466; G06F 17/18; G06F 9/45558; G06F 2009/45591; G06F 2009/45595

USPC ........................................................ 702/182
See application file for complete search history.

(56) References Cited

U.S. PATENT DOCUMENTS

| | | | |
|---|---|---|---|
| 2012/0022350 A1* | 1/2012 | Teixeira | A61B 5/0205 600/324 |
| 2014/0259011 A1 | 9/2014 | Tashiro et al. | |
| 2015/0209670 A1 | 7/2015 | Furumoto et al. | |

FOREIGN PATENT DOCUMENTS

| | | | |
|---|---|---|---|
| CN | 103620625 A | * | 3/2014 |
| JP | 2013-171542 A | | 9/2013 |
| JP | 2014-170482 A | | 9/2014 |
| JP | 2015-139699 A | | 8/2015 |
| JP | 2016197450 A | * | 11/2016 |
| JP | 2017-129931 A | | 7/2017 |

* cited by examiner

*Primary Examiner* — John H Le
(74) *Attorney, Agent, or Firm* — Fujitsu Patent Center

(57) ABSTRACT

A non-transitory computer-readable recording medium stores therein an analysis program for causing a computer to execute a process including: acquiring information capable of identifying functions in operation which is obtained by a sampling by a plurality of operating systems at each first time interval with respect to programs in operation; totaling a number of pieces of the acquired information for each function; generating time-series data indicating the number of pieces of the information at each second time interval for the function whose number of pieces of the information satisfies a prescribed condition; analyzing a causal relationship between the functions based on the time-series data; and outputting an analysis result of the causal relationship between the functions.

9 Claims, 20 Drawing Sheets

FIG. 8

| FUNCTION NAME | FREQUENCY (%) | NUMBER OF SAMPLES |
|---|---|---|
| FUNCTION 1 | 38 | 11,400 |
| FUNCTION 2 | 18 | 5,400 |
| FUNCTION 7 | 15 | 4,500 |
| FUNCTION 2 | 11 | 3,300 |
| FUNCTION 5 | 8 | 2,400 |
| ... | ... | ... |

FIG. 9

| FUNCTION NAME | NUMBER OF SAMPLES | | | |
|---|---|---|---|---|
| | T1 | T2 | ... | Tn |
| FUNCTION 1 | 400 | 200 | ... | 300 |
| FUNCTION 2 | 160 | 250 | ... | 150 |
| FUNCTION 7 | 150 | 110 | ... | 160 |

FIG. 10

| FUNCTION NAME-VM·host | NUMBER OF SAMPLES | | | |
|---|---|---|---|---|
| | T1 | T2 | ... | Tn |
| VM2-host | 250 | 280 | ... | 300 |
| FUNCTION 1-host | 50 | 30 | ... | 45 |
| FUNCTION 7-host | 35 | 50 | ... | 40 |
| FUNCTION 1-VM1 | 90 | 90 | ... | 120 |
| FUNCTION 2-VM1 | 120 | 110 | ... | 90 |
| FUNCTION 7-VM1 | 50 | 100 | ... | 80 |
| FUNCTION 3-VM2 | 120 | 90 | ... | 110 |
| FUNCTION 5-VM2 | 40 | 60 | ... | 50 |
| FUNCTION 8-VM2 | 35 | 50 | ... | 60 |
| ... | ... | ... | ... | ... |

DELETION → (VM2-host row)

FIG. 11

| FUNCTION NAME-VM·host | NUMBER OF SAMPLES | | | |
|---|---|---|---|---|
| | T1 | T2 | ... | Tn |
| FUNCTION 1 | 50 | 30 | ... | 45 |
| FUNCTION 7 | 35 | 50 | ... | 40 |
| FUNCTION 1-VM1 | 90 | 90 | ... | 120 |
| FUNCTION 2-VM1 | 120 | 110 | ... | 90 |
| FUNCTION 7-VM1 | 50 | 100 | ... | 80 |
| FUNCTION 3-VM2 | 120 | 90 | ... | 110 |
| FUNCTION 5-VM2 | 40 | 60 | ... | 50 |
| FUNCTION 8-VM2 | 35 | 50 | ... | 60 |
| ... | ... | ... | ... | ... |

FIG. 12

| FUNCTION NAME-VM·host | FREQUENCY (%) | NUMBER OF SAMPLES |
|---|---|---|
| FUNCTION 1-host | 21 | 9,400 |
| FUNCTION 2-VM1 | 18 | 7,600 |
| FUNCTION 5-VM2 | 15 | 6,500 |
| FUNCTION 3-VM3 | 13 | 5,300 |
| FUNCTION 2-VM2 | 8 | 3,900 |
| FUNCTION 4-VM1 | 7 | 3,200 |
| FUNCTION 5-host | 6 | 2,800 |
| FUNCTION 4-VM2 | 3 | 1,400 |
| FUNCTION 2-VM3 | 3 | 1,400 |
| FUNCTION 4-VM3 | 2 | 900 |
| FUNCTION 1-VM2 | 2 | 900 |
| ... | ... | ... |

FIG. 15

|  | T0 (P(F(t))) | T1 (P(F(t+1))) | T2 (P(F(t+2))) |
|---|---|---|---|
| FUNCTION A | 50 (0.5) | 10 (0.1) | 20 (0.2) |
| FUNCTION B | 10 (0.1) | 70 (0.7) | 60 (0.6) |
| FUNCTION C | 40 (0.4) | 20 (0.2) | 20 (0.2) |

FIG. 17

|  |  | CAUSE | | | |
|---|---|---|---|---|---|
|  |  | FUNCTION 1-VM1 | FUNCTION 2-VM1 | FUNCTION 7-VM1 | |
| RESULT | FUNCTION 1-VM1 | 0.325 | 0.125 | 0.025 | |
|  | FUNCTION 2-VM1 | 0.825 | 0.225 | 0.114 | |
|  | FUNCTION 3-VM1 | 0.025 | 0.125 | 0.514 | |
|  | FUNCTION 3-VM2 | 0.125 | 0.214 | 0.224 | |
|  | FUNCTION 5-VM2 | 0.625 | 0.110 | 0.016 | ... |
|  | FUNCTION 6-VM2 | 0.925 | 0.104 | 0.011 | |
|  | FUNCTION 9-VM3 | 0.114 | 0.814 | 0.020 | |
|  | FUNCTION 5-VM3 | 0.016 | 0.925 | 0.054 | |
|  | FUNCTION 4-VM3 | 0.010 | 0.009 | 0.109 | |
|  | FUNCTION 1-VM4 | 0.005 | 0.008 | 0.004 | |

RECORDING MEDIUM AND INFORMATION PROCESSING APPARATUS

CROSS-REFERENCE TO RELATED APPLICATION

This application is based upon and claims the benefit of priority of the prior Japanese Patent Application No. 2018-238854, filed on Dec. 20, 2018, the entire contents of which are incorporated herein by reference.

FIELD

The embodiment discussed herein is related to a recording medium and an analysis apparatus.

BACKGROUND

In a system in which a plurality of virtual machines run on a physical server, when an abnormality such as a delay in processing occurs, an analysis of the cause is carried out. In this case, the cause is analyzed by using trace data or the like including operation states of the virtual machines, for example.

Related art is disclosed in Japanese Laid-open Patent Publication No. 2015-139699, Japanese Laid-open Patent Publication No. 2017-129931, Japanese Laid-open Patent Publication No. 2014-170482 and Japanese Laid-open Patent Publication No. 2013-171542.

SUMMARY

According to an aspect of the embodiments, a non-transitory computer-readable recording medium stores therein an analysis program for causing a computer to execute a process including: acquiring information capable of identifying functions in operation which is obtained by a sampling by a plurality of operating systems at each first time interval with respect to programs in operation; totaling a number of pieces of the acquired information for each function; generating time-series data indicating the number of pieces of the information at each second time interval for the function whose number of pieces of the information satisfies a prescribed condition; analyzing a causal relationship between the functions based on the time-series data; and outputting an analysis result of the causal relationship between the functions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a table representing an example of the number of samples and a frequency of each function within a predetermined time;

FIG. 9 is a table representing an example of time-series data of the number of samples;

FIG. 10 is a table representing an example of time-series data of the number of samples in all OSs;

FIG. 11 is a table representing an example of time-series data of the number of samples in all OSs after having deleted duplicate data;

FIG. 12 is a table representing an example of the number of samples and a frequency for each function in all OSs within a predetermined time;

FIG. 15 is a table representing an example of time-series data of the number of samples in a calculation example;

FIG. 17 is a table representing an example of a causal relationship analysis result;

DESCRIPTION OF EMBODIMENTS

Figure 1:
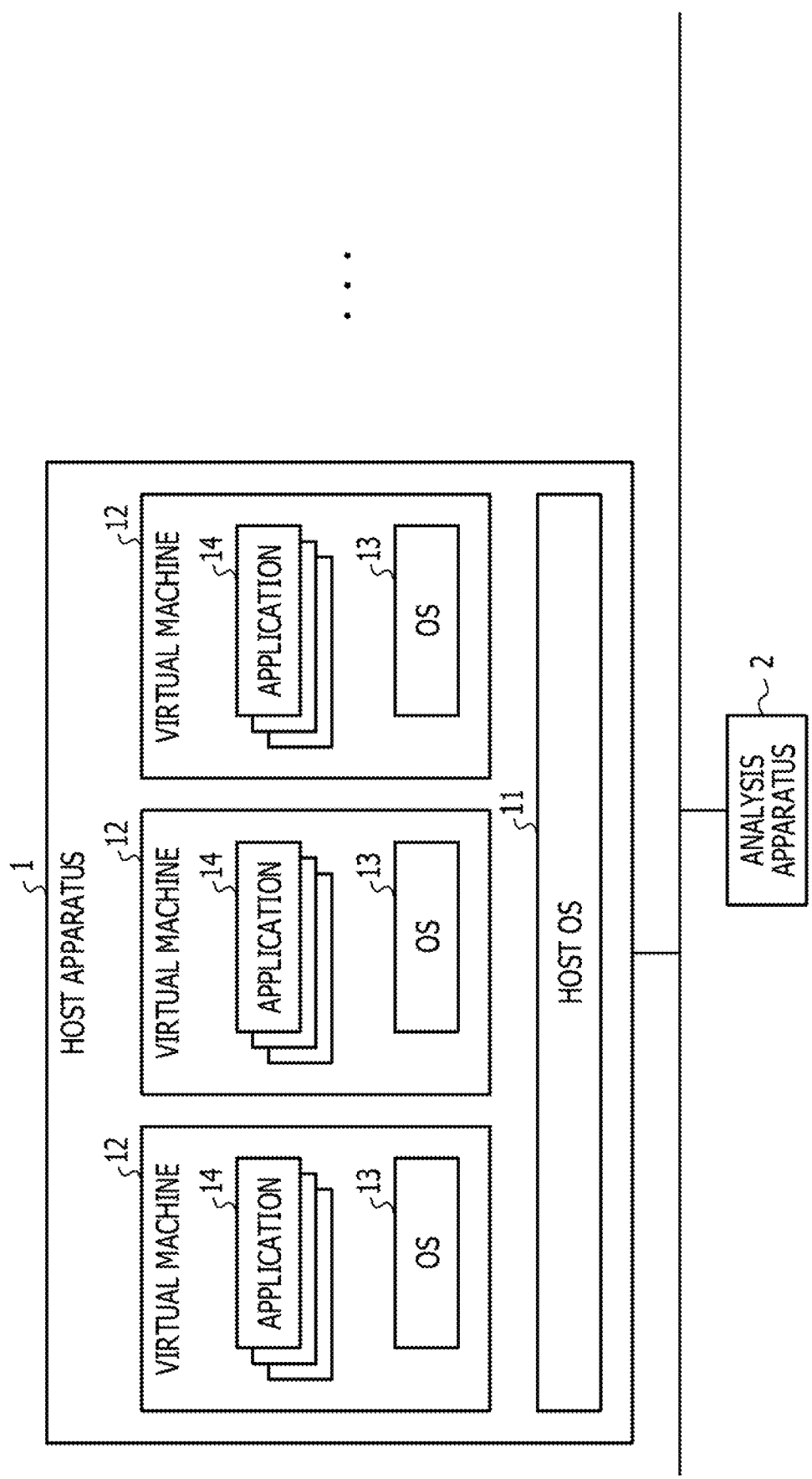
FIG. 1 is a diagram illustrating an example of an overall configuration of a system according to an embodiment.

For example, a delay time at each of a plurality of user terminals is recorded, and a request from a user terminal is executed on condition that the delay time is within a threshold value.

For example, based on trace data obtained on a physical computer, trace data obtained on a virtual computer running on the physical computer is edited.

For example, trace information including an operation state of a process on a virtual machine is associated with a symbol map for identifying processes operating on a plurality of virtual machines.

For example, in a large-scale distributed processing system, a delayed process is extracted, and a location where input/output of the data related to the extracted process was executed is specified.

There is a possibility that the cause of an abnormality generated in a program operating on any one of a plurality of operating systems (OSs) is present in a program operating on another OS. For example, when an abnormality occurs during the operation of a program on a virtual machine, there is a possibility that the cause of occurrence of the abnormality is present in another virtual machine, a host OS, or the like. In this case, even when the cause of occurrence of the abnormality is analyzed by using an analysis tool, it is not easy to analyze the cause thereof in a case where the analysis tool does not support the analysis of the system including the plurality of OSs.

A cause of occurrence of an abnormality in a program of a system including a plurality of OSs may be easily analyzed, as one aspect of the present disclosure.

For example, it is assumed that a user of a virtual machine detects an abnormality of a program operating on the virtual machine, and contacts an administrator of a host apparatus. The abnormality of the program is, for example, a situation that a processing time of a specific function is prolonged, and a processing delay occurs. The administrator examines a performance profile of the virtual machine in which the abnormality has occurred, and consequently specifies a function in which the abnormality has occurred. Investigation methods such as an instruction trace, a function trace, and a memory dump are used in order to specify a cause of occurrence of the abnormality. However, there is a possibility that an abnormality occurs in a function operating on a virtual machine, and the cause of the occurrence of the abnormality is present at the outside of the virtual machine (another virtual machine, a hypervisor, a host OS, or the like). In such a case, the above-mentioned methods do not support the analysis of a system including a plurality of OSs, so that it is difficult to specify the cause of the abnormality.

In addition, each of the above methods has a problem that the processing overhead is large. When the function trace and the memory dump are used, an amount of work of the user increases because the program is modified to insert a hook point or the like, and is recompiled in advance. When the function trace is used, there is a risk that the object to be examined is limited to a specific type of program (a kernel or specific application). In order to specify the analysis of the abnormality by using the above methods, a user familiar with the program contents is required to analyze the trace data, source code, and the like, whereby the amount of work of the user increases.

An embodiment will be described below with reference to the accompanying drawings. FIG. 1 is a diagram illustrating an example of an overall configuration of a system of the embodiment. The system of the embodiment includes a host apparatus 1 and an analysis apparatus 2. The system of the embodiment may include a plurality of host apparatuses 1. When the system of the embodiment includes the plurality of host apparatuses 1, the plurality of host apparatuses 1 is able to communicate with each other via a communication network such as a local area network (LAN) or a wide area network (WAN). A server, a personal computer, or the like is used as the host apparatus 1 and the analysis apparatus 2, for example. The analysis apparatus 2 is an example of a computer.

The host apparatus 1 includes a host OS 11 and virtual machines 12 to run on the host OS 11. In the example illustrated in FIG. 1, the number of virtual machines 12 running in the single host apparatus 1 is three, but the number of virtual machines 12 may be of other numbers. Each of the virtual machines 12 runs on, for example, virtualization software (not illustrated). The host apparatus 1 may include a hypervisor instead of the host OS 11 and the virtualization software.

Each virtual machine 12 includes an OS 13, and one or plurality of applications 14 to operate on the OS 13. Each application 14 is implemented by a program including one or a plurality of functions. Each virtual machine 12 is operated by, for example, one or a plurality of virtual central processing units (CPUs) (not illustrated).

In the following description, when the host OS 11 and the OS 13 of the virtual machine 12 are not distinguished from each other, they may be simply referred to as an OS.

The analysis apparatus 2 and the host apparatus 1 are able to communicate with each other via a communication network such as a LAN or WAN. The analysis apparatus 2 analyzes the abnormality of the program operating on the virtual machine 12 by using the information collected from the host apparatus 1.

Figure 2:
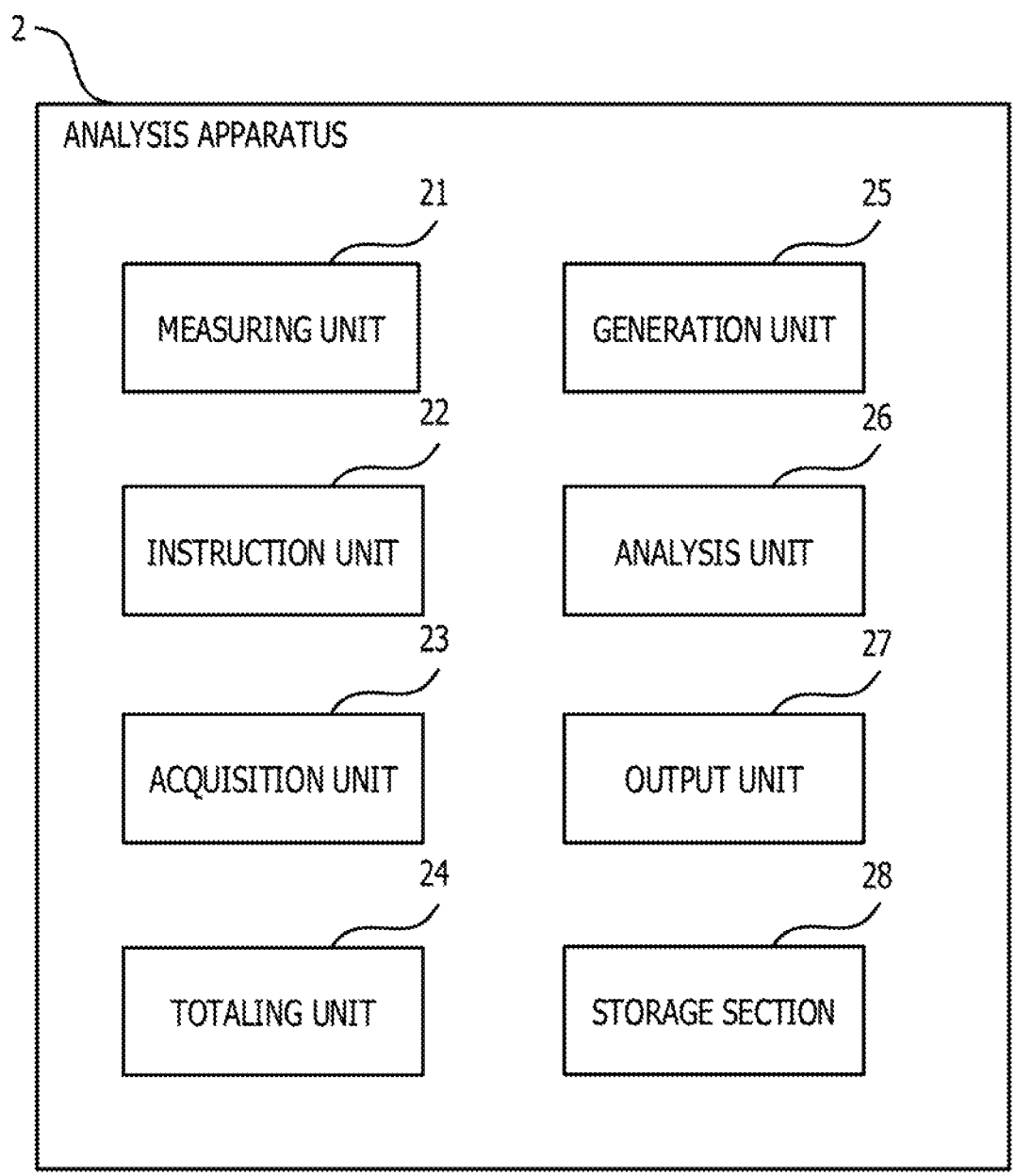
FIG. 2 is a diagram illustrating an example of a functional configuration of an analysis apparatus.

FIG. 2 is a diagram illustrating an example of a functional configuration of the analysis apparatus 2. The analysis apparatus 2 includes a measuring unit 21, an instruction unit 22, an acquisition unit 23, a totaling unit 24, a generation unit 25, an analysis unit 26, an output unit 27, and a storage unit 28.

The measuring unit 21 measures latencies for the plurality of OSs. The measuring unit 21 transmits a prescribed command (for example, a ping command) to the plurality of OSs (the host OS 11 of the host apparatus 1 and the OSs 13 of the virtual machines 12 illustrated in FIG. 1), and stores a half of each period of time until the response is received, as a latency, in the storage unit 28.

When the instruction unit 22 has received an abnormality report from a performance monitoring tool, for example, the instruction unit 22 transmits an instruction to execute sampling to the analysis target OSs (the host OS 11 of the host apparatus 1 and the OSs 13 of the virtual machines 12). The performance monitoring tool is mounted in the analysis apparatus 2 in advance to monitor the performance of each OS, and sends a report when an abnormality is detected.

The acquisition unit 23 acquires, from each of the plurality of OSs, information capable of identifying functions in operation that the OSs have obtained by sampling at each first time interval with respect to the programs in operation. The first time interval is, for example, 1 ms. Hereinafter, information capable of identifying a function in operation may be referred to as a sample. The acquisition unit 23 stores the acquired sample in the storage unit 28 while associating the acquired sample with the time of sampling executed by each OS.

The totaling unit 24 totals the number of samples having been acquired within a predetermined time (for example, 30 seconds) for each function. The totaling unit 24 excludes a period of time based on the latency of each OS measured by the measuring unit 21, from the totaling target time of the number of samples.

For example, the totaling unit 24 selects a predetermined number (for example, three) of functions in a descending order of the number of samples from among the results of totaling in each OS, as generation targets of time-series data. Alternatively, the totaling unit 24 may select, for example, a predetermined number (for example, 10) of functions in a descending order of the number of samples from among the results of totaling in all the OSs, as generation targets of time-series data.

The generation unit 25 generates time-series data indicating the number of samples at each second time interval for the function whose number of samples satisfies a prescribed condition. The function whose number of samples satisfies the prescribed condition is a function selected by the totaling unit 24 based on the number of samples, as described above, for example. The second time interval is, for example, one second. The generation unit 25 excludes the period of time based on the latency of each OS measured by the measuring unit 21, from the generation target of the time-series data.

The analysis unit 26 carries out a causal relationship analysis of the plurality of functions based on the time-series data generated by the generation unit 25. In the causal relationship analysis, the analysis unit 26 performs Bayesian estimation by using, for example, the ratio (frequency) of the number of samples indicating a function within the second time interval to the total number of samples within the second time interval as an operation probability of the function. The analysis unit 26 performs Bayesian estimation to calculate, when any one of the functions is operated, a probability that another function has been operated.

The output unit 27 outputs a result of the causal relationship analysis having been carried out by the analysis unit 26. The output unit 27 may be, for example, a display device to display the result of the causal relationship analysis. The output unit 27 may transmit, for example, the causal relationship analysis result to another information processing apparatus or the like.

The storage unit 28 stores various kinds of data related to the process carried out by the analysis apparatus 2. The storage unit 28 stores, for example, the measurement results of the latencies measured by the measuring unit 21, the samples acquired by the acquisition unit 23, the result of totaling obtained by the totaling unit 24, the time-series data generated by the generation unit 25, and the causal relationship analysis result obtained by the analysis unit 26.

Figure 3:
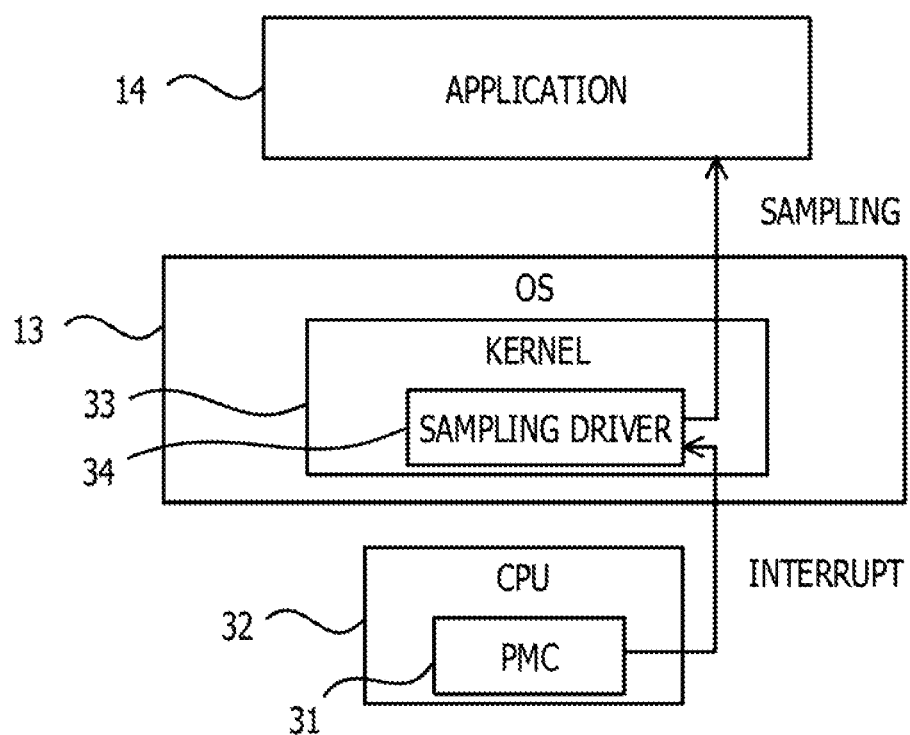
FIG. 3 is a diagram illustrating an example of a sampling method of an OS.

FIG. 3 is a diagram illustrating an example of a sampling method of an OS. FIG. 3 illustrates a sampling method performed by the OS 13 of the virtual machine 12. The OS 13 includes a kernel 33, and the kernel 33 includes a sampling driver 34. A CPU 32 is a virtual CPU configured to run the virtual machine 12. A performance monitoring counter (PMC) 31 included in the CPU 32 outputs, to the sampling driver 34, an interrupt triggered by an overflow of a register counter, for example. An interrupt generation interval is considered to be 1 ms, for example.

The sampling driver 34 acquires (samples) information from the application 14 at an interval (first interval) corresponding to the interrupt from the PMC 31. The information acquired by the sampling driver 34 is information (sample) capable of identifying an operating program, function or the like, and it is a process identification (PID), an instruction address, or the like, for example.

Figure 4:
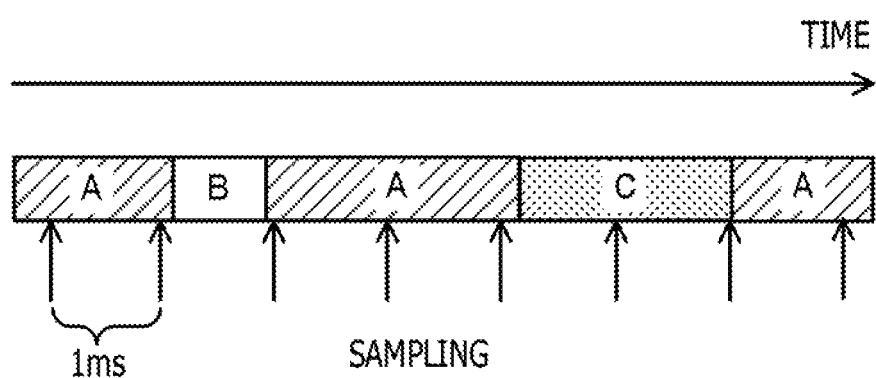
FIG. 4 is a diagram illustrating an example of a sampling execution situation for a plurality of functions.

FIG. 4 is a diagram illustrating an example of a sampling execution situation for a plurality of functions. "A", "B", and "C" illustrated in FIG. 4 indicate functions in operation. The sampling driver 34 of the OS 13 executes sampling from the application 14 at an interval (for example, 1 ms) corresponding to the interrupt from the PMC 31 as described above. As illustrated in FIG. 4, since the sampling is executed at a set interval, the sampling driver 34 acquires a larger number of samples indicating the function as the operating time of the function is longer. For example, the acquired number of samples corresponds to the operating time of the function. Since the sampling executed while using the PMC 31 is low in overhead, the degradation in performance due to the sampling is small.

When an abnormality report indicating a performance degradation is received from the performance monitoring tool, the analysis apparatus 2 transmits an instruction to execute sampling to the OS 13 from the instruction unit 22. After receiving the sampling execution notification, the OS 13 executes sampling, as illustrated in FIG. 3, for a predetermined time (for example, one minute), and transmits the acquired samples to the analysis apparatus 2. The OS 13 may continuously execute sampling from the application 14 all the time, for example. Then, when an instruction to execute sampling is received from the instruction unit 22, the OS 13 may transmit the samples having been collected for a predetermined time until the point in time of receiving the sampling execution instruction, to the analysis apparatus 2.

In the case where the virtual machine 12 has a performance monitoring tool, the OS 13 executes sampling for a predetermined time after receiving a report indicating an abnormality from the performance monitoring tool, and then transmits the acquired samples to the analysis apparatus 2. In the case where the virtual machine 12 has the performance monitoring tool, the OS 13 may continuously execute sampling all the time, and when a report indicating an abnormality is received from the performance monitoring tool, the OS 13 may transmit the samples having been collected for a predetermined time until the point in time of receiving the above report, to the analysis apparatus 2.

The sampling executed by the OS 13 of the virtual machine 12 has been described, and it is considered that the same is applied to the sampling executed by the host OS 11.

Figure 5:
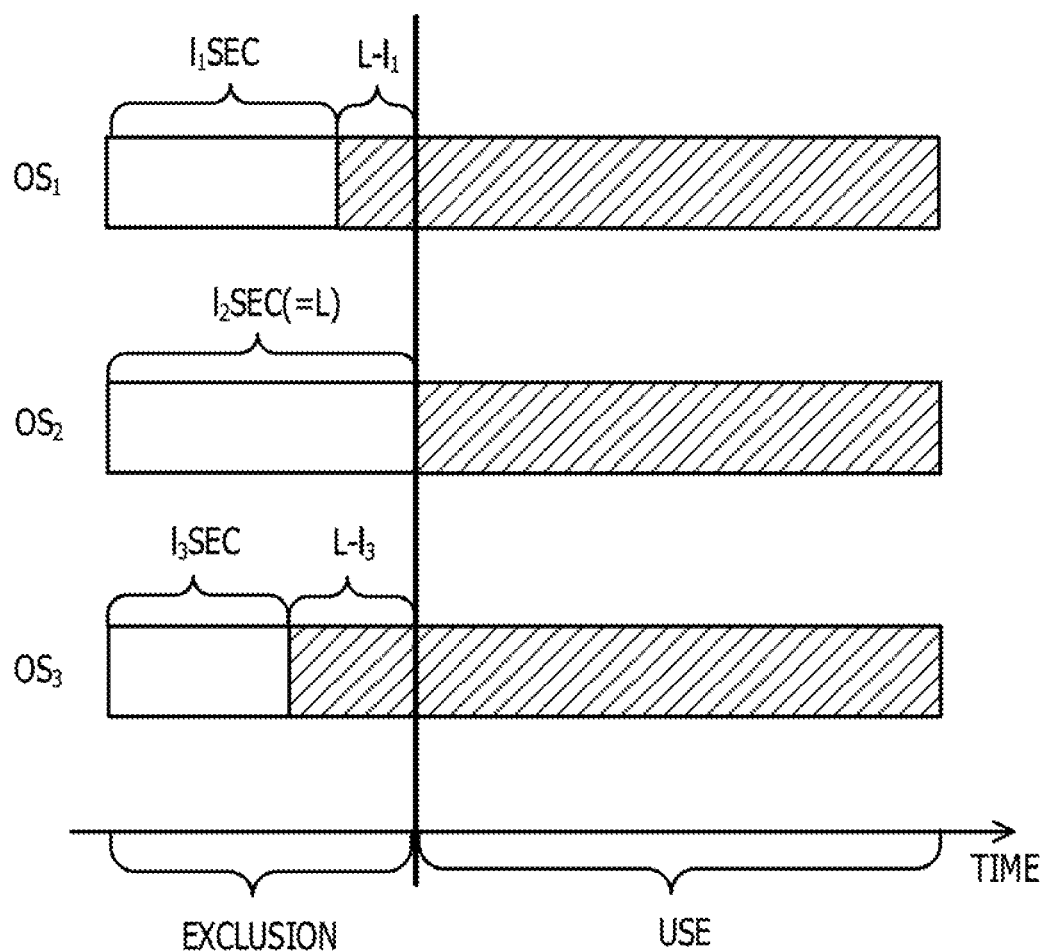
FIG. 5 is a diagram illustrating an example of a method for excluding application of sampling.

FIG. 5 is a diagram illustrating an example of a method for excluding application of sampling. When the instruction unit 22 has received an abnormality report from a performance monitoring tool, for example, the instruction unit 22 transmits an instruction to execute sampling to the analysis target OSs (the host OS 11 of the host apparatus 1 and the OSs 13 of the virtual machines 12). A secure shell (SSH), for example, is used for the above execution instruction. The instruction unit 22 may transmit, to the host apparatus 1, parameters such as a sampling interval and a sampling duration time together with the sampling execution instruction.

After the instruction unit 22 transmits the sampling execution instruction, there is a possibility that the time (latency) until each of the OSs starts sampling is different from each other for each OS. Therefore, the timings at which the OSs start sampling may be different from each other. Accordingly, the measuring unit 21 transmits a ping command to each OS, and stores, as a latency, a half of the period of time until the response is received, in the storage unit 28 in advance. It is considered that the latency measured by the measuring unit 21 corresponds to a period of time from the time when the analysis apparatus 2 transmits a sampling execution instruction to the host apparatus 1 to the time when the OS starts the sampling.

In the example illustrated in FIG. 5, a latency $l_2$ of an $OS_2$ is the longest among the latencies of a plurality of OSs ($OS_1$, $OS_2$, and $OS_3$). The longest latency $l_2$ is taken as L. The totaling unit 24 excludes the time from when the instruction unit 22 transmits a sampling execution instruction to each OS to when L seconds elapses (an exclusion target time) from the totaling target time of the number of samples. Similarly, the generation unit 25 excludes the exclusion target time from the time-series data generation target time. As illustrated in FIG. 5, the exclusion target time in the $OS_1$ is $L-l_1$ seconds, the exclusion target time in the $OS_2$ is $l_2$ (L) seconds, and the exclusion target time in the $OS_3$ is $L-l_3$ seconds.

As described above, the analysis apparatus 2 excludes the period of time based on the latency of each OS from the totaling target time of the number of samples and from the time-series data generation target time. This makes it possible for the analysis apparatus 2 to suppress a drop in accuracy of the analysis result due to the influence of the latency, without setting for time start-point adjustment, time synchronization, or the like of the plurality of OSs.

Figure 6:
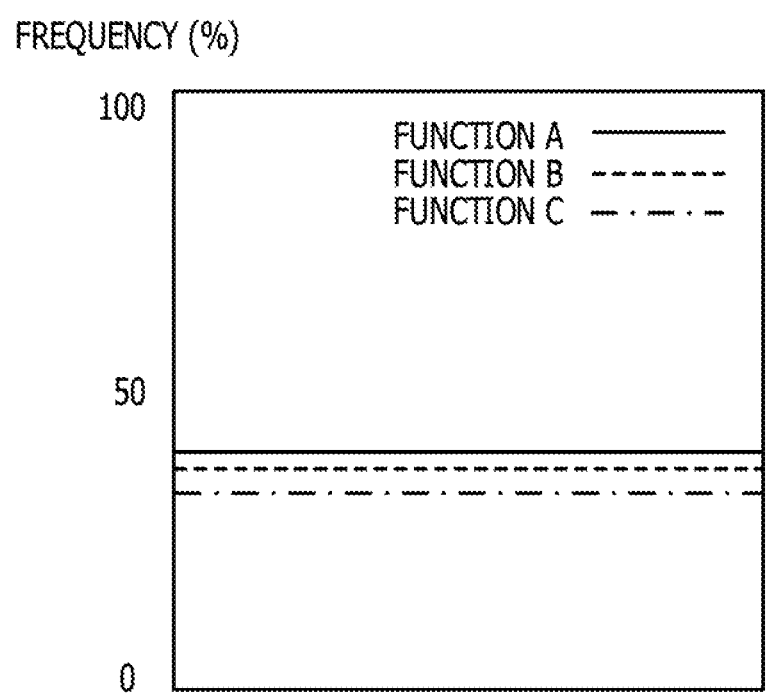
FIG. 6 is a graph illustrating an example of a frequency of a function within a predetermined time.

FIG. 6 is a graph illustrating an example of a frequency of each of the functions within a predetermined time. The frequency (%) illustrated in FIG. 6 is a ratio of the total number of samples obtained by sampling within a predetermined time for each function. As in the example illustrated in FIG. 6, it is considered that the frequency of each of the functions is larger in the order of the functions A, B, and C.

Figure 7:
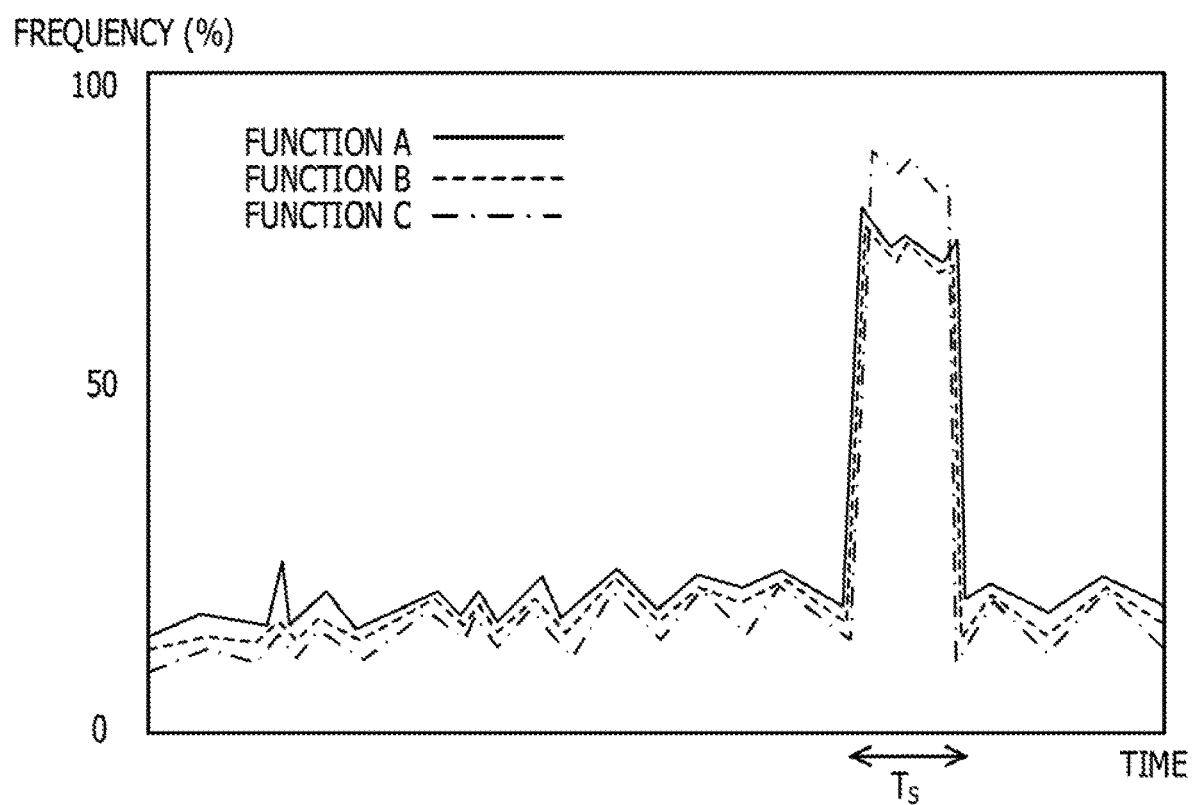
FIG. 7 is a graph illustrating an example of time-series data of a frequency of a function within a predetermined time.

FIG. 7 is a graph illustrating an example of time-series data of a frequency of each of the functions within a predetermined time. As in the example illustrated in FIG. 7, it is considered that the frequency is larger in the order of the functions A, B, and C in most of the time zones. However, in a time zone $T_s$ in which the frequency of each function is significantly increased, the frequency of the function C is the highest. For example, the analysis apparatus 2 is able to confirm a change in behavior of the functions by generating time-series data, and is able to specify the function that has performed an abnormal operation in a specific time zone. Thus, the analysis apparatus 2 is able to easily find an intermittent failure, for example.

FIG. 8 is a table representing an example of the number of samples and a frequency of each function within a predetermined time. It is considered that the data represented in FIG. 8 is a result of totaling by the totaling unit 24 for the samples of one OS. The totaling unit 24 totals the samples obtained by sampling within the predetermined time for each function. The frequency represented in FIG. 8 indicates the ratio of the number of samples of each function to the total number of samples obtained by sampling within the predetermined time.

The totaling unit 24 sorts the functions in a descending order of the number of samples, for example, and selects N (for example, three) functions from the top as a time-series data generation target (for example, the functions inside a broken line frame in FIG. 8). For example, the totaling unit 24 may select one or a plurality of functions as time-series data generation targets so that the sum total of the ratios of the functions of the time-series data generation targets is equal to or greater than a predetermined value (for example, 80%). The setting of the number of functions to be selected (the above-mentioned number N) or the sum total of the ratios (the above-mentioned predetermined value) may be changed according to an instruction from a user. For example, in the case where the user, after referring to the analysis result, inputs an instruction to change the number of functions to be selected or the sum total of the ratios to the analysis apparatus 2, the totaling unit 24 may change the setting according to the instruction and carry out the totaling again.

The totaling unit 24 carries out a similar totaling process using the samples acquired from each of the OSs, and generates a result of totaling for each OS similar to the result of totaling as represented in FIG. 8.

FIG. 9 is a table representing an example of time-series data of the number of samples. It is considered that the data represented in FIG. 9 is a result of totaling of the samples for one OS. T1, T2, . . . , and Tn are examples of the second time interval. As represented in FIG. 8, it is assumed that the function 1, the function 2, and the function 7 have been selected as the generation targets. The generation unit 25 generates time-series data of the number of samples of each second time interval with respect to the selected functions. The generation unit 25 carries out a similar process for the samples of each of the OSs to generate time-series data similar to that represented in FIG. 9 for each OS.

Note that the generation unit 25 may generate time-series data for all the functions in the same manner as in FIG. 9, and may extract N (for example, three) functions from the top in terms of the number of samples to generate new time-series data of each second time interval. The analysis unit 26 may carry out a causal relationship analysis using the stated time-series data.

FIG. 10 is a table representing an example of time-series data of the number of samples in all OSs. The generation unit 25 combines time-series data of the number of samples of each second time interval (for example, FIG. 9) of the respective OSs to generate the time-series data represented in the example of FIG. 10. Note that "host" is an example of the host apparatus 1, and "VM1" and "VM2" are examples of the virtual machine 12.

In FIG. 10, VM2-host refers to the number of samples indicating the VM2 on which sampling has been executed by the host OS 11 of the host apparatus 1. The above number of samples overlaps with the number of samples obtained by the sampling executed by the OS 13 of the VM2 (the number of samples of function 3-VM2, function 5-VM2, and function 8-VM2). For example, when there exists any sample obtained by the sampling executed by the virtual machine 12, the generation unit 25 deletes, from the time-series data, the number of samples that the host OS 11 obtained by sampling from the virtual machine 12.

FIG. 11 is a table representing an example of time-series data of the number of samples in all OSs after having deleted the duplicate data. The time-series data represented in FIG. 11 is data obtained by removing the data of VM2-host from the time-series data represented in FIG. 10. In this manner, when there exists any sample obtained by the sampling executed by the virtual machine 12, the generation unit 25 deletes, from the time-series data, the number of samples that the host OS 11 obtained by sampling from the virtual machine 12. This makes it possible for the analysis apparatus 2 to suppress a situation in which the duplicate result is outputted.

Note that the time-series data represented in FIG. 10 and FIG. 11 may include a frequency indicating the ratio of the number of samples of each function to the total number of samples obtained by sampling within the second time interval, similarly to the data illustrated in FIG. 8.

FIG. 12 is a table representing an example of the number of samples and a frequency for each function in all OSs within a predetermined time. The example represented in FIG. 8 is a result of the totaling carried out by the totaling unit 24 with respect to the samples of one OS, while the example represented in FIG. 12 is a result of the totaling carried out by the totaling unit 24 with respect to the samples of all OSs. The frequency indicates the ratio of the number of samples of each function to the total number of samples acquired from all the OSs. It is considered that the totaling unit 24 deletes the data of the number of samples that the host OS 11 obtained by sampling from the virtual machine 12 in advance.

In the data represented in FIG. 12, the totaling unit 24 sorts the functions in a descending order of the number of samples, for example, and selects N (for example, 10) functions from the top as totaling targets of time-series data (for example, the functions inside a broken line frame depicted in FIG. 12). For example, the totaling unit 24 may select one or a plurality of functions as the totaling targets of time-series data so that the sum total of the frequencies of the totaling target functions becomes equal to or greater than a predetermined value (for example, 80%). The generation unit 25 generates time-series data similar to the example represented in FIG. 11, with respect to the selected functions.

It is to be noted that there is a possibility that even functions that operate on the same virtual machine 12 use different physical CPUs. Therefore, the generation unit 25 may generate time-series data in which physical CPUs are distinguished.

As in the example represented in FIG. 12, the analysis apparatus 2 collectively totals the numbers of samples of all OSs, and by taking the functions with a large number of samples as totaling targets of time-series data, the totaling may be carried out at a time to simplify the totaling process, for example, even when the number of OSs to be analyzed is large.

Next, an example of calculations carried out by the analysis unit 26 will be described in detail. The analysis unit 26 calculates a probability that a certain function is a cause of operation of another function by using Bayesian estimation, for example. For example, P(A) is a probability that A occurs, P(B) is a probability that B occurs, P(A|B) is a probability that A occurs after B occurs, and P(B|A) is a probability that B occurs after A occurs. In this case, the following Formula (1) is established.

$$P(A|B)=P(B|A) \times P(A)/P(B) \qquad (1)$$

In the Formula (1), P(A) is referred to as a priori probability, and P(A|B) is referred to as a posterior probability. In a case where an event B occurs after an event A, P(A|B) represents a probability that the event A has occurred when the event B occurs.

Assuming that a frequency (%) of a function F at a certain time t is taken as P(F(t)), P(F(t)) is expressed by the following Formula (2). Here, a period of time from t−1 to t is an example of the second time interval. That is, the frequency of the function F is the ratio of the number of samples indicating the function F within the second time interval to the total number of samples within the second time interval.

$$P(F(t))=\text{(the number of samples of the function } F \text{ from } t-1 \text{ to } t)/\text{(the total number of samples of all the functions from } t-1 \text{ to } t) \qquad (2)$$

When Bayesian estimation illustrated in Formula (1) is used while A being F(t) and B being F(t+1), the following Formula (3) is obtained.

$$P(F(t)|F(t+1))=P(F(t+1)|F(t)) \times P(F(t))/P(F(t+1)) \qquad (3)$$

In a case where there exists a plurality of functions, when each function is represented as $F_i$ (i=1, 2, . . . ) or $F_j$=1, 2, . . . ), the following Formula (4) is obtained.

$$P(F_i(t)|F_j(t+1))=P(F_j(t+1)|F_i(t)) \times P(F_i(t))/P(F_j(t+1)) \qquad (4)$$

Figure 13:
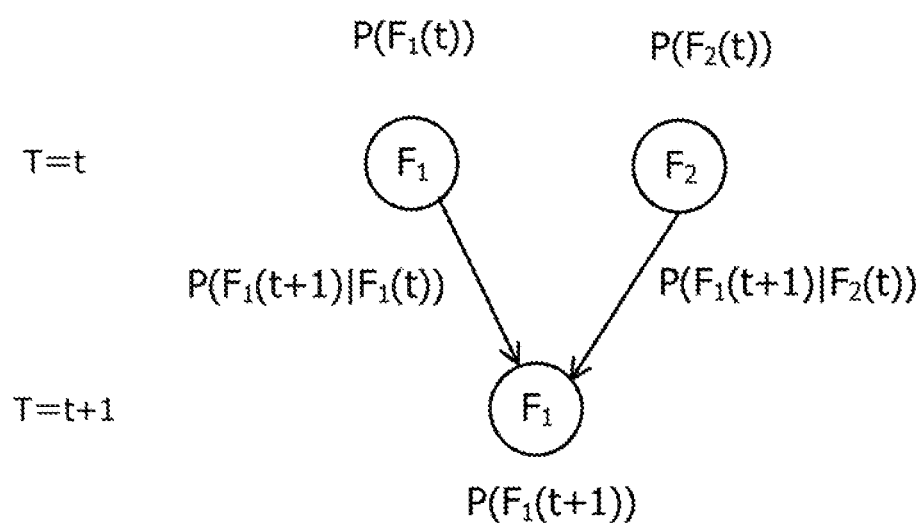
FIG. 13 is a diagram illustrating a first example of a causal relationship between functions.

FIG. 13 is a diagram illustrating a first example of a causal relationship between functions. FIG. 13 illustrates an example in which two causal candidate functions $F_1(t)$ and $F_2(t)$ are present for $F_1(t+1)$. For example, the probability that $F_2(t)$ is a cause of operation of $F_1(t+1)$ is expressed as follows.

$$P(F_2(t)|F_1(t+1))=P(F_1(t+1)|F_2(t)) \times P(F_2(t))/P(F_1(t+1)) \qquad (5)$$

Since, of the three terms on the right side in Formula (5), $P(F_2(t))$ and $P(F_1(t+1))$ are frequencies with respect to the respective functions, the analysis unit 26 is able to calculate them by using a formula similar to Formula (2). Since $P(F_1(t+1)|F_2(t))$ is a probability that $F_1(t+1)$ occurs after $F_2(t)$ occurs, the analysis unit 26 is able to calculate it by using the data from the time t to time t+1 on the samples held in time series, in the manner as the following Formula (6).

$$P(F_1(t+1)|F_2(t))=\text{(the number of samples of } F_1 \text{ present next to the samples of } F_2)/\text{(the total number of samples of } F_2) \qquad (6)$$

Figure 14:
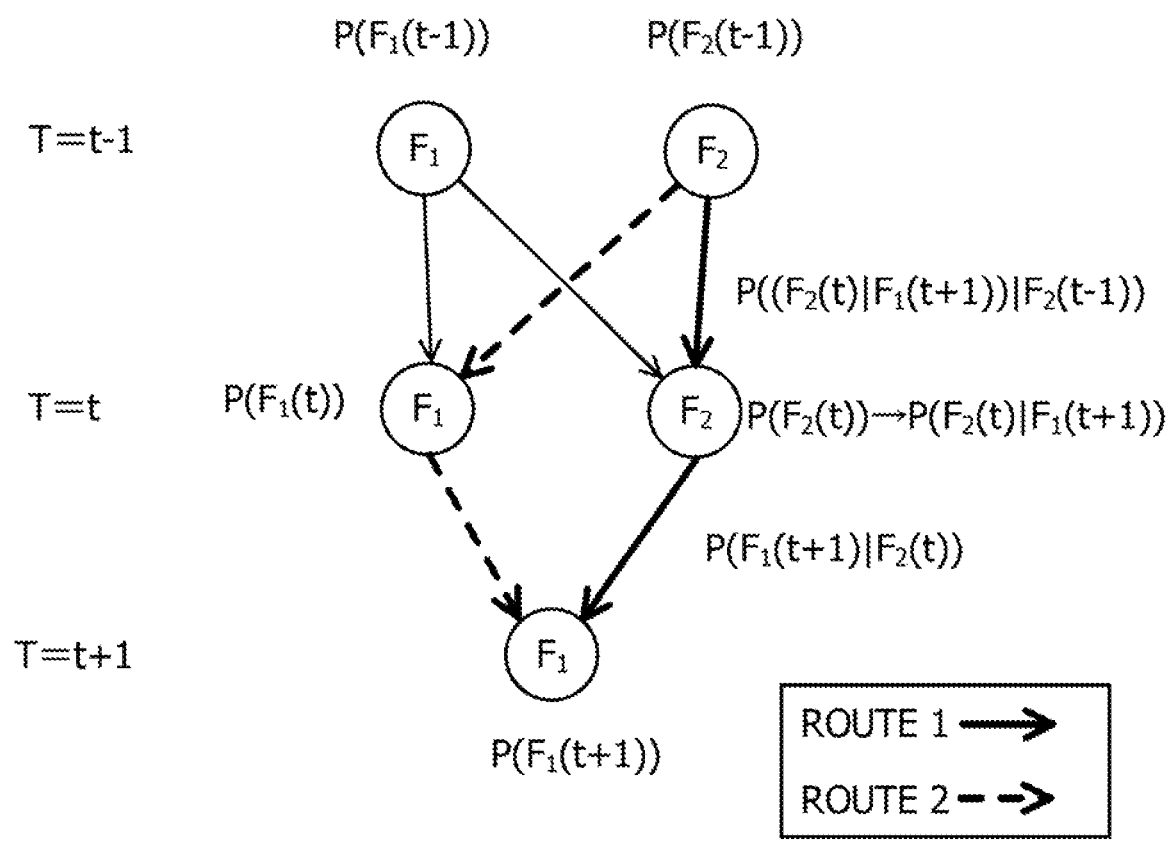
FIG. 14 is a diagram illustrating a second example of a causal relationship between functions.

FIG. 14 is a diagram illustrating a second example of a causal relationship between functions. FIG. 14 illustrates an example in which there are two causal candidate functions for the occurrence of the function $F_1(t+1)$. In the example illustrated in FIG. 14, the analysis unit 26 goes back to the time t−1 and then the Bayesian estimation is applied. For example, the probability that the cause of the occurrence of the function $F_1(t+1)$ is $F_2(t-1)$ is expressed as $P(F_2(t-1)|F_1(t+1))$. Since $P(F_2(t-1)|F_1(t+1))$ is considered to be the total of a route 1 and a route 2 illustrated in FIG. 14, the analysis unit 26 first calculates a portion relating to the route 1 of $P(F_2(t-1)|F_1(t+1))$. Since the route 1 is a route passing through $F_2(t)$, the analysis unit 26 replaces $F_1(t+1)$ in $P(F_2(t-1)|F_1(t+1))$ with $F_2(t)|F_1(t+1)$ to calculate the above portion, as illustrated in Formula (7).

$$\text{The route 1 of } P(F_2(t-1)|F_1(t+1)) \rightarrow P(F_2(t-1)| ((F_2(t)|F_1(t+1)))=P((F_2(t)|F_1(t+1))|F_2(t-1)) \times P(F_2(t-1))/P(F_2(t)|F_1(t+1))) \qquad (7)$$

Note that $P((F_2(t)F_1(t+1))|F_2(t-1))$ in Formula (7) indicates a path from $F_2(t-1)$ to $F_2(t)$ in the path 1 as illustrated in FIG. 14, and is a probability in which $F_2(t)$ in $P(F_2(t)|F_2(t-1))$ is replaced with $F_2(t)|F_1(t+1)$. The analysis unit 26 is able to calculate this probability based on the data of the number of samples in the same manner as Formula (6). The analysis unit 26 is also able to calculate $P(F_2(t)|F_1(t+1))$ in the same manner as Formula (5).

Similarly, the analysis unit 26 calculates a probability indicated by the route 2 illustrated in FIG. 14, and by adding the probability indicated by the route 1 to the probability indicated by the route 2, it is possible to calculate a probability that the cause of the operation of $F_1(t+1)$ is $F_2(t-1)$. As discussed above, the analysis unit 26 carries out the causal relationship analysis by Bayesian estimation using the ratio (for example, the frequency illustrated in Formula (2)) of the number of pieces of information indicating the function within the second time interval to the total number of samples within the second time interval as the operation probability of the function. When any one of the functions is operated, it is possible to calculate the probability (cause probability) that another function has been operated.

FIG. 15 is a table representing an example of time-series data of the number of samples in a calculation example. Hereinafter, the calculation of the causal relationship analysis result using the time-series data represented in FIG. 15 will be described. It is considered that the generation unit 25 has generated the time-series data for the three functions A, B, and C, as illustrated in FIG. 15. T0 represents a time interval from t−1 to t, T1 represents a time interval from t to t+1, and T2 represents a time interval from t+1 to t+2. Each numerical value refers to the number of samples within the second time interval (one second), and each value in the parentheses refers to the frequency calculated by a formula similar to Formula (2). The underlined numerical values are numerical values used in the calculations to be described later.

Figure 16:
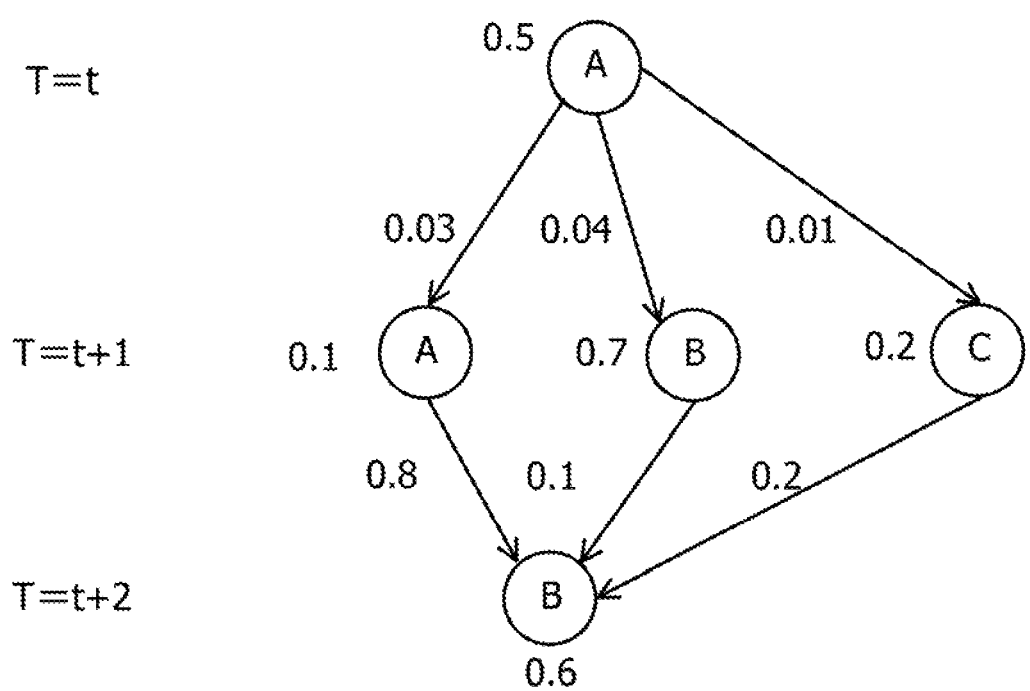
FIG. 16 is a diagram illustrating a third example of a causal relationship between functions.

FIG. 16 is a diagram illustrating a third example of a causal relationship between functions. The example represented in FIG. 16 corresponds to the time-series data illustrated in FIG. 15, and numerical values assigned to the nodes indicating the functions A to C are the frequencies illustrated in FIG. 15. Each numerical value assigned to an arrow indicates a probability of the route, and is calculated by a formula similar to Formula (6). For example, it is indicated that, after the function A is operated at the time t+1, the probability that the function B is operated at the time t+2 is 0.8. The probability of each route is expressed as follows.

$$P(B(t+2)|A(t+1))=0.8 \qquad (8\text{-}1)$$

$$P(B(t+2)|B(t+1))=0.1 \qquad (8\text{-}2)$$

$$P(B(t+2)|C(t+1))=0.2 \quad (8\text{-}3)$$

$$P(A(t+1)|A(t))=0.03 \quad (8\text{-}4)$$

$$P(B(t+1)|A(t))=0.04 \quad (8\text{-}5)$$

$$P(C(t+1)|A(t))=0.01 \quad (8\text{-}6)$$

A calculation example of a probability $P(A(t)|B(t+2))$ telling that the cause of the operation of the function B at the time t+2 is the operation of the function A at the time t, will be described by using the data illustrated in FIGS. 15 and 16. $P(A(t)|B(t+2))$ is expressed by the following Formula (9).

$$\begin{aligned}P(A(t)|B(t+2))=&P(A(t)|A(t+1)|B(t+2))+P(A(t)|B(t+1)|B\\&(t+2))+P(A(t)|C(t+1)|B(t+2))=P(A(t)|A(t+1)|B(t+2))\\&+P(A(t)|(B(t+1)|B(t+2)))+P(A(t)|(C(t+1)|B(t+2)))\end{aligned} \quad (9)$$

The analysis unit 26 converts each term of Formula (9) as illustrated in the following Formulae (10-1) to (10-3) using Bayesian estimation.

$$P(A(t)|(A(t+1)|B(t+2)))=P((A(t+1)|B(t+2))|A(t))\times P(A(t))/P(A(t+1)|B(t+2)) \quad (10\text{-}1)$$

$$P(A(t)|(B(t+1)|B(t+2)))=P((B(t+1)|B(t+2))|A(t))\times P(A(t))/P(B(t+1)|B(t+2)) \quad (10\text{-}2)$$

$$P(A(t)|(C(t+1)|B(t+2)))=P((C(t+1)|B(t+2))|A(t))\times P(A(t))/P(C(t+1)|B(t+2)) \quad (10\text{-}3)$$

In the example illustrated in FIG. 16, since only the function B operates at the time t+2, $P((A(t+1)|B(t+2))|A(t))$ of Formula (10-1) may be replaced with $P(A(t+1)|A(t))$. Similarly, $P((B(t+1)|B(t+2))|A(t))$ may be replaced with $P(B(t+1)|A(t))$, and $P((C(t+1)|B(t+2))|A(t))$ may be replaced with $P(C(t+1)|A(t))$. Further, by using the calculation results of (8-4) to (8-6), it is possible for the analysis unit 26 to calculate the first term of Formulae (10-1) to (10-3) as follows.

$$P((A(t+1)|B(t+2))|A(t))=P(A(t+1)|A(t))=0.03 \quad (11\text{-}1)$$

$$P((B(t+1)|B(t+2))|A(t))=P(B(t+1)|A(t))=0.04 \quad (11\text{-}2)$$

$$P((C(t+1)|B(t+2))|A(t))=P(C(t+1)|A(t))=0.01 \quad (11\text{-}3)$$

As illustrated in FIG. 15, $P(A(t))$ as the second term in Formulae (10-1) to (10-3) is 0.5. When the analysis unit 26 uses Bayesian estimation for the third term of Formulae (10-1) to (10-3), and also uses the frequencies illustrated in FIG. 15 and the calculation results of (8-1) to (8-3), the calculations may be made as in the following Formulae (12-1) to (12-3).

$$P(A(t+1)|B(t+2))=P(B(t+2)|A(t+1))\times P(A(t+1))/P(B(t+2))=0.8\times 0.1/0.6=0.13 \quad (12\text{-}1)$$

$$P(B(t+1)|B(t+2))=P(B(t+2)|B(t+1))\times P(B(t+1))/P(B(t+2))=0.1\times 0.7/0.6=0.12 \quad (12\text{-}2)$$

$$P(C(t+1)|B(t+2))=P(B(t+2)|C(t+1))\times P(C(t+1))/P(B(t+2))=0.2\times 0.2/0.6=0.07 \quad (12\text{-}3)$$

As described above, the analysis unit 26 is able to calculate Formulae (10-1) to (10-3) as in the following Formulae (13-1) to (13-3).

$$P(A(t)|(A(t+1)|B(t+2)))=P((A(t+1)|B(t+2))|A(t))\times P(A(t))/P(A(t+1)|B(t+2))=0.03\times 0.5/0.13=0.12 \quad (13\text{-}1)$$

$$P(A(t)|(B(t+1)|B(t+2)))=P((B(t+1)|B(t+2))|A(t))\times P(A(t))/P(B(t+1)|B(t+2))=0.04\times 0.5/0.12=0.17 \quad (13\text{-}2)$$

$$P(A(t)|(C(t+1)|B(t+2)))=P((C(t+1)|B(t+2))|A(t))\times P(A(t))/PP(C(t+1)|B(t+2))=0.01\times 0.5/0.07=0.07 \quad (13\text{-}3)$$

The analysis unit 26 applies, to Formula (9), the calculation results of Formulae (13-1) to (13-3), thereby obtaining a calculation result as indicated by Formula (14) for $P(A(t)|B(t+2))$.

$$\begin{aligned}P(A(t)|B(t+2))=&P(A(t)|(A(t+1)|B(t+2)))+P(A(t)|\\&(B(t+1)|B(t+2)))+P(A(t)|(C(t+1)|B(t+2)))=0.12+\\&0.17+0.07=0.36\end{aligned} \quad (14)$$

Therefore, the probability that the cause of the operation of the function B at the time t+2 is the operation of the function A at the time t is 0.36 (36%).

Although the example in which the analysis unit 26 carries out a causal relationship analysis of a plurality of functions by using Bayesian estimation is described above, the analysis unit 26 may carry out a causal relationship analysis by using a method other than Bayesian estimation. The analysis unit 26 may carry out a causal relationship analysis of a plurality of functions by using, for example, the randomized controlled trial (RCT).

FIG. 17 is a table representing an example of a causal relationship analysis result. The analysis unit 26 calculates, when any one of functions (a function described in a row of result in FIG. 17) is operated, a probability that another function (a function described in a column of cause in FIG. 17) has been operated, by using a method such as Bayesian estimation as described above. Each numerical value represented in FIG. 17 is a probability calculated by the analysis unit 26. The output unit 27 outputs, for example, the causal relationship analysis result represented in the example of FIG. 17.

In a case where an abnormality occurs in any function, a user may estimate which function has caused the occurrence of the abnormality by referring to the causal relationship analysis result. For example, in the case where an abnormality occurs in a function 5-VM3, the user may recognize that the function with the highest cause probability is a function 2-VM1 by referring to the row of the function 5-VM3 in FIG. 17. Then, the user may estimate that there is a possibility that a processing delay has occurred in the function 5-VM3 due to the occurrence of a processing delay in the function 2-VM1.

An output form of the causal relationship analysis result is not limited to the example in FIG. 17. For example, when input of a function in which an abnormality occurred is received from a user, the output unit 27 may output identification information of functions of a predetermined number in a descending order of probability from among the functions that may be the cause of the operation of the function with the abnormality, as candidates for the cause function along with the probabilities thereof. Alternatively, the output unit 27 may output identification information of functions whose probabilities are equal to or greater than a predetermined threshold value, as candidates for the function that may be the cause of the operation of the inputted function along with the probabilities thereof.

Figure 18:
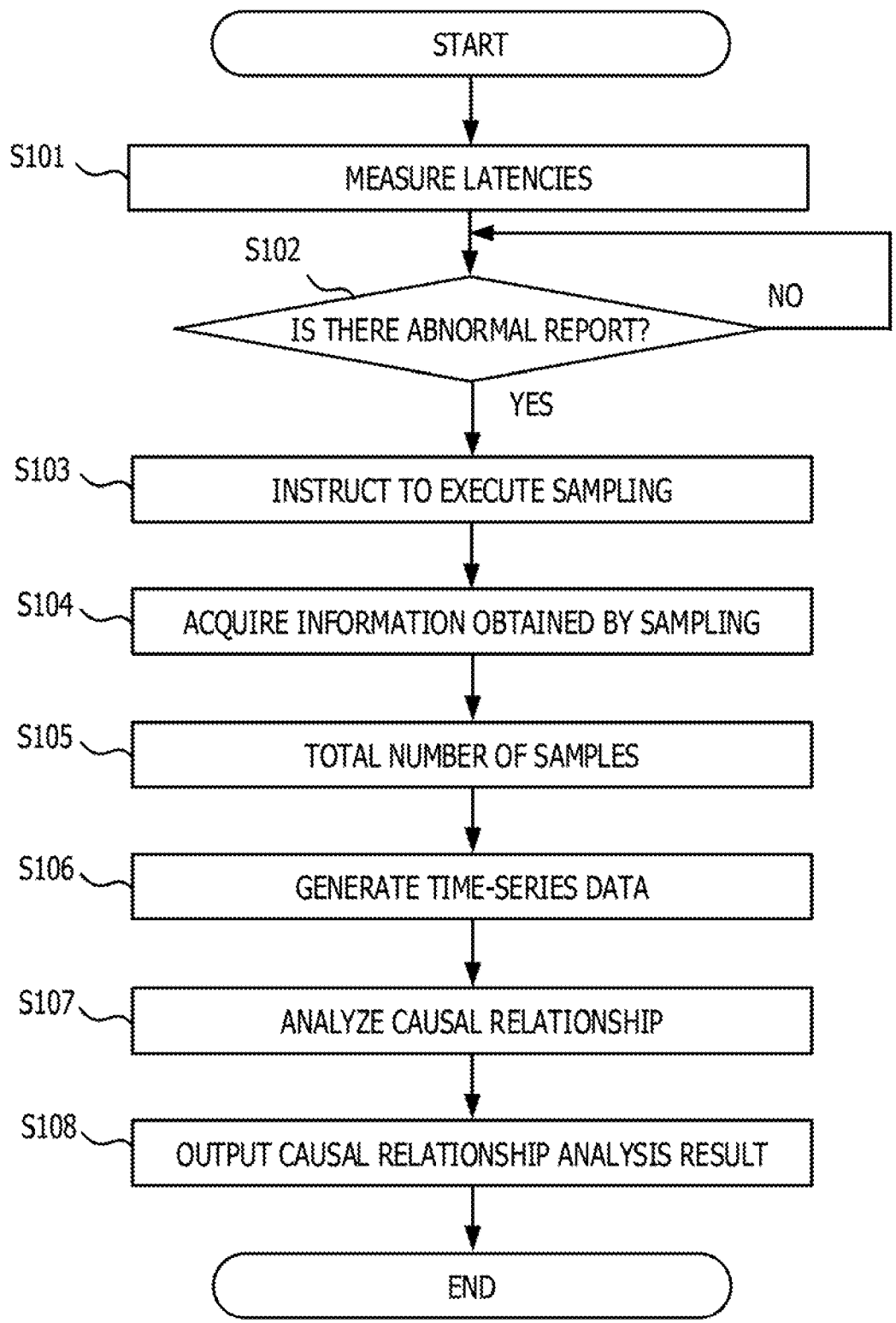
FIG. 18 is a flowchart illustrating an example of a process carried out by an analysis apparatus according to an embodiment.

FIG. 18 is a flowchart illustrating an example of a process carried out by the analysis apparatus of the embodiment. The measuring unit 21 measures latencies for a plurality of OSs (step S101). When the instruction unit 22 has received an abnormality report from the performance monitoring tool (YES in step S102), the instruction unit 22 transmits an instruction to execute sampling to analysis target OSs (step S103). In the case of NO in step S102, the process does not proceed to the next step.

The acquisition unit 23 acquires, from each of the plurality of OSs, information capable of identifying functions in operation obtained by the sampling executed by the OSs at each first time interval (for example, 1 ms) with respect to programs in operation (step S104). The totaling unit 24 totals the number of samples acquired within a predetermined time (for example, 30 seconds) for each function (step S105). The totaling unit 24 excludes a period of time based on the latency of each OS measured by the measuring unit 21, from the totaling target time of the number of samples. The totaling result of the totaling unit 24 is data including the number of samples and frequencies as represented in FIG. 8 or FIG. 12, for example.

The generation unit 25 generates time-series data indicating the number of samples at each second time interval for the function whose number of samples satisfies a prescribed condition (step S106). The generation unit 25 excludes the period of time based on the latency of each OS measured by the measuring unit 21, from the generation target time of the time-series data. The time-series data generated by the generation unit 25 is, for example, the data represented in FIG. 11. In addition, when there exists any sample that the virtual machine 12 has obtained by sampling, the generation unit 25 deletes the number of samples that the host OS 11 has obtained by sampling from the virtual machine 12, from the time-series data in order to avoid data duplication.

The analysis unit 26 carries out a causal relationship analysis of the plurality of functions based on the time-series data generated by the generation unit 25 (step S107). For example, the analysis unit 26 carries out a causal relationship analysis by Bayesian estimation, in which the ratio (frequency) of the number of samples indicating the function within the second time interval to the total number of samples within the second time interval is used as an operation probability of the above function.

The output unit 27 outputs a result of the causal relationship analysis carried out by the analysis unit 26 (step S108). The output unit 27 is, for example, a display device to display the causal relationship analysis result. The output unit 27 may transmit, for example, the causal relationship analysis result to another information processing apparatus or the like.

As described above, the analysis apparatus 2 is able to easily analyze the causes of abnormalities that occurred in the functions operating on the plurality of OSs. For example, when an abnormality occurs in a function operating on the virtual machine 12 as in the example illustrated in FIG. 1, the cause thereof may be easily analyzed even in a case where a causal function is present in other virtual machines 12 or the host OS 11. Since the analysis apparatus 2 is an apparatus separate from the host apparatus 1 where the virtual machines 12 are in operation, it is possible to carry out the analysis without stopping the host apparatus 1 where the virtual machines 12 are in operation. Further, since the analysis apparatus 2 carries out the analysis based on the information obtained by sampling, it is possible to carry out the analysis without recompiling the analysis target programs.

Figure 19:
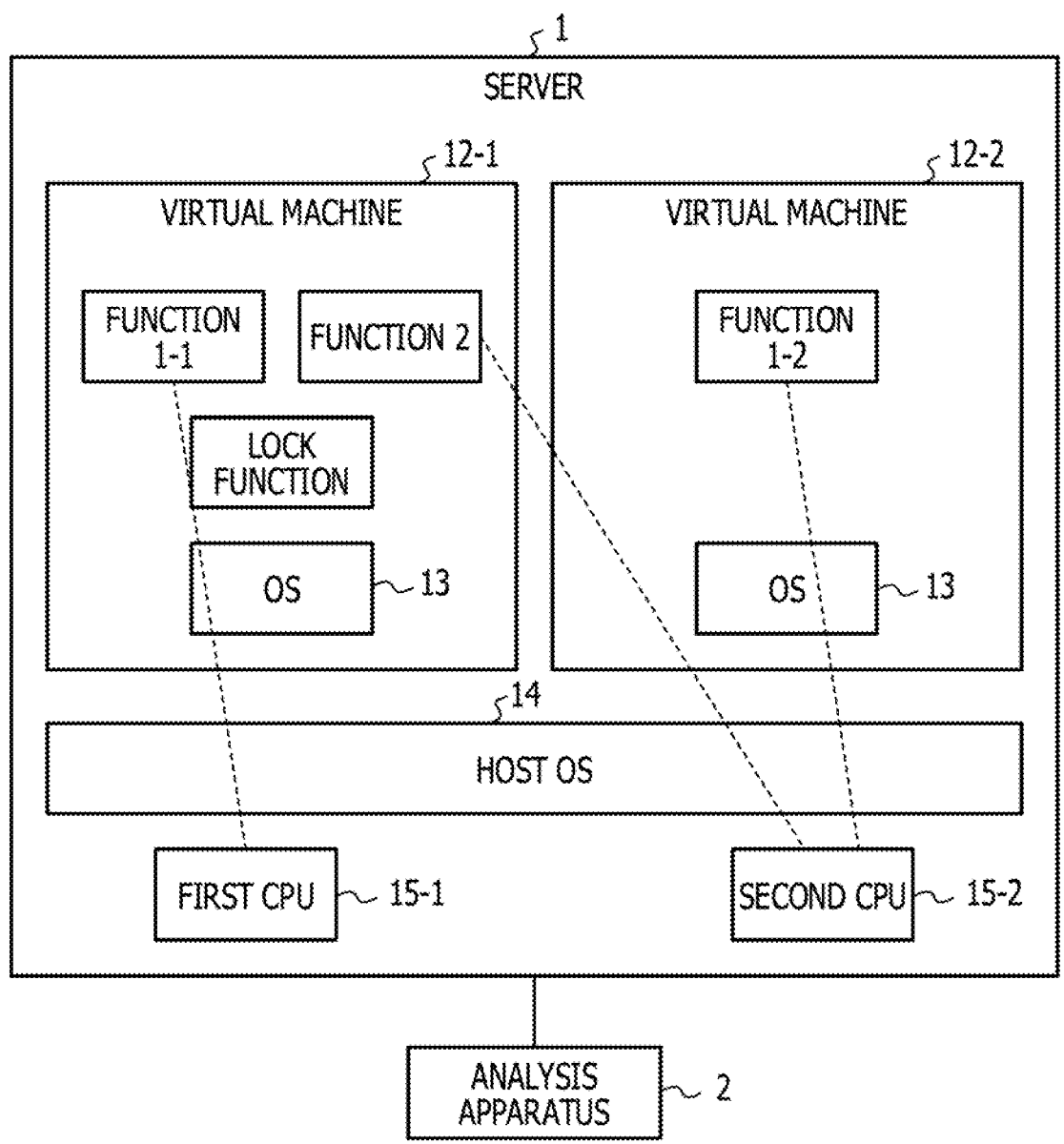
FIG. 19 is a diagram illustrating an application example of a process according to the present embodiment.

FIG. 19 is a diagram illustrating an application example of a process of the present embodiment. Virtual machines 12-1 and 12-2 in FIG. 19 correspond to the virtual machines 12 in FIG. 1. A first CPU 15-1 and a second CPU 15-2 are physical CPUs. A function 1-1 to operate on the virtual machine 12-1 uses the first CPU 15-1, and a function 2 to operate on the virtual machine 12-1 and a function 1-2 to operate on the virtual machine 12-2 use the second CPU 15-2. It is considered that the assignment of the functions to the physical CPUs is fixed in FIG. 19.

In the case of the functions using the same physical CPU, it is readily assumed that, when one of the functions is operated, the other one of the functions is affected by that. However, in the case where a plurality of functions uses different physical CPUs, it is not easy to analyze a causal relationship between the functions. For example, in the example illustrated in FIG. 19, it is considered that the function 1-2 and the function 1-1 are associated with a lock function to operate on the virtual machine 12-1. Then, when the function 1-2 is operated, it is considered that the lock function is operated and affects the operation of the function 1-1. In such a case, when a processing delay occurs in the function 1-1, it is not easy to specify the cause thereof.

The analysis apparatus 2 of the present embodiment analyzes a causal relationship of the functions based on the number of samples acquired from the plurality of OSs. Therefore, it is possible to analyze a causal relationship even between the functions (the functions 1-1 and 1-2) configured to operate on the different virtual machines and to use the different physical CPUs, as in the example illustrated in FIG. 19.

Figure 20:
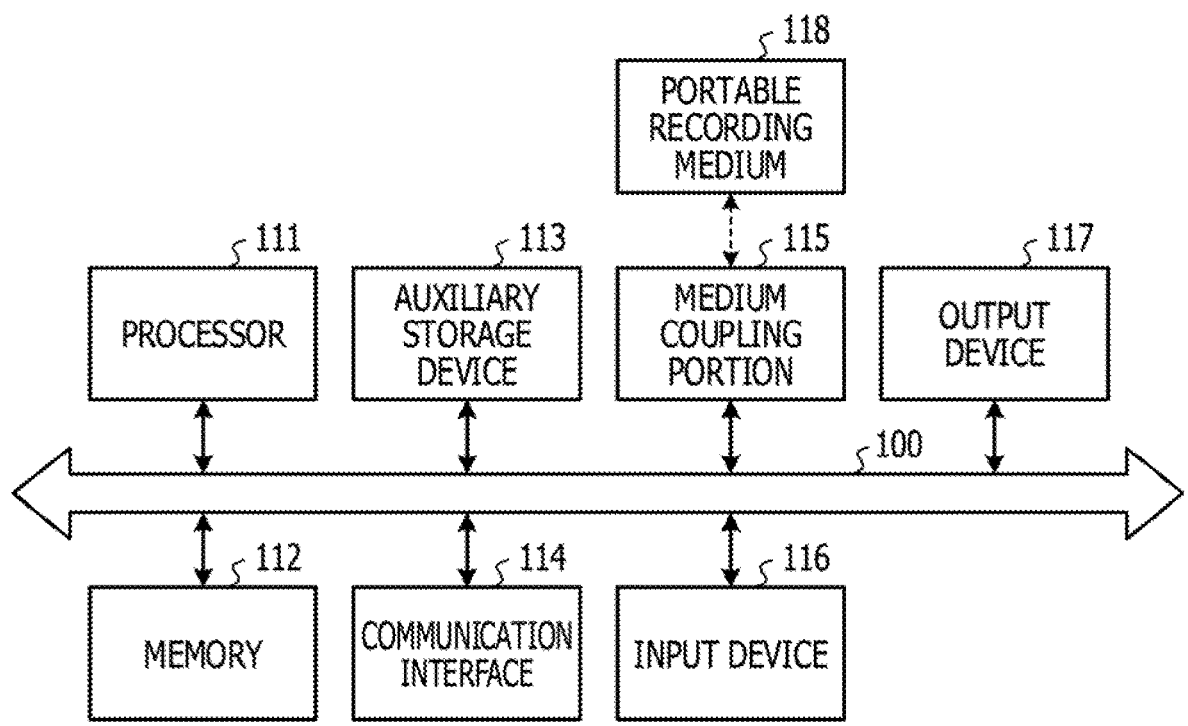
FIG. 20 is a diagram illustrating an example of a hardware configuration of an analysis apparatus.

Next, an example of a hardware configuration of the analysis apparatus 2 will be described. FIG. 20 is a diagram illustrating an example of the hardware configuration of the analysis apparatus 2. As illustrated in the example of FIG. 20, in the analysis apparatus 2, a processor 111, a memory 112, an auxiliary storage device 113, a communication interface 114, a medium coupling unit 115, an input device 116, and an output device 117 are coupled to a bus 100.

The processor 111 executes a program loaded to the memory 112. An analysis program configured to carry out the process in the embodiment may be applied to the program to be executed.

The memory 112 is, for example, a random-access memory (RAM). The auxiliary storage device 113 is a storage device configured to store various kinds of information. For example, a hard disk drive, a semiconductor memory, or the like may be used as the auxiliary storage device 113. The analysis program configured to carry out the process of the embodiment may be stored in the auxiliary storage device 113.

The communication interface 114 is coupled to a communication network such as a local area network (LAN) or a wide area network (WAN). The communication interface 114 performs data conversion or the like involved in communication. The communication interface 114 illustrated in FIG. 20 may be applied to the output unit 27 illustrated in FIG. 2.

The medium coupling unit 115 is an interface to which a portable recording medium 118 is able to be coupled. An optical disc (for example, a compact disc (CD) or a digital versatile disc (DVD)), a semiconductor memory, or the like may be used as the portable recording medium 118. The analysis program configured to carry out the process of the embodiment may be stored on the portable recording medium 118.

The memory 112, the auxiliary storage device 113, and the portable recording medium 118 are non-transitory computer-readable physical storage media and are not temporary media such as signal carriers.

The input device 116 is, for example, a keyboard, a pointing device, or the like. The input device 116 accepts input of an instruction, information, and so forth from a user.

The output device 117 is, for example, a display device, a printer, a speaker, or the like. The output device 117 outputs an inquiry or an instruction to a user, a processing result, and so forth. The output device 117 illustrated in FIG. 20 may be applied to the output unit 27 illustrated in FIG. 2.

The storage unit 28 illustrated in FIG. 2 may be implemented by the memory 112, the auxiliary storage device 113, the portable recording medium 118, or the like. The measuring unit 21, the instruction unit 22, the acquisition unit 23, the totaling unit 24, the generation unit 25, and the analysis unit 26 illustrated in FIG. 2 may be achieved by the processor 111 executing the analysis program loaded to the memory 112.

It is to be noted that the analysis apparatus 2 may not include all of the constituent elements illustrated in FIG. 20, and some of the constituent elements may be omitted. Further, some constituent elements may be present in an external device of the analysis apparatus 2, and the analysis apparatus 2 may be coupled to the external device to utilize the constituent elements within the external device.

The present embodiment is not limited to the above-described embodiment, and various modifications, additions, and omissions are applicable without departing from the gist of the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an analysis program for causing a computer to execute a process, the process comprising:
   acquiring information capable of identifying functions in operation which is obtained by a sampling by a plurality of operating systems at each first time interval with respect to programs in operation;
   totaling a number of samples of the information which are sampled in a first time period which is obtained by subtracting a latency of each operating system from a totaling time period to total the number of samples of the information for each function;
   generating time-series data indicating the number of pieces of the information at each second time interval in a second time period which is obtained by subtracting the latency of each operating system from a generation time period to generate the time-series data for the function whose number of samples of the information satisfies a prescribed condition;
   analyzing a causal relationship between the functions based on the time-series data; and
   outputting an analysis result of the causal relationship between the functions.

2. The non-transitory computer-readable recording medium according to claim 1, wherein the plurality of operating systems includes an operating system of a virtual machine and an operating system of a host apparatus on which the virtual machine runs, and the information capable of identifying the functions in operation which is obtained by the sampling by the plurality of operating systems at each first time interval with respect to the programs in operation is acquired.

3. The non-transitory computer-readable recording medium according to claim 1, the process further comprising: in the causal relationship analysis, by performing Bayesian estimation while using a ratio of a number of pieces of the information capable of identifying one of the functions within the second time interval to a number of pieces of all the information within the second time interval as an operation probability of the one of the functions, calculating a probability that, when the one of the functions is operated, another one of the functions has been in operation; and outputting the calculated probability as the analysis result of the causal relationship.

4. The non-transitory computer-readable recording medium according to claim 1, comprising:
   measuring latencies for the plurality of operating systems; and
   excluding an exclusion target time based on a period of time from when a sampling execution instruction is transmitted to the plurality of operating systems to when the latencies elapse, from the totaling time period and from the generation time period to obtain the first time period and the second time period.

5. An information processing apparatus comprising:
   a memory; and
   a processor coupled to the memory and configured to:
      acquire information capable of identifying functions in operation which is obtained by a sampling by a plurality of operating systems at each first time interval with respect to programs in operation;
      total the number of samples of the information which are sampled in a first time period which is obtained by subtracting a latency of each operating system from a totaling time period to total the number of samples of the information for each function;
      generate time-series data indicating a number of pieces of the information at each second time interval in a second time period which is obtained by subtracting the latency of each operating system from a generation time period to generate the time-series data for the function whose number of pieces of the information satisfies a prescribed condition;
      analyze a causal relationship between the functions based on the time-series data; and
      output an analysis result of the causal relationship between the functions.

6. The information processing apparatus according to claim 5, wherein the plurality of operating systems includes an operating system of a virtual machine and an operating system of a host apparatus on which the virtual machine runs, and the information capable of identifying the functions in operation which is obtained by the sampling by the plurality of operating systems at each first time interval with respect to the programs in operation is acquired.

7. The information processing apparatus according to claim 5, wherein the processor is configured to:
   in the causal relationship analysis, by performing Bayesian estimation while using a ratio of a number of pieces of the information capable of identifying one of the functions within the second time interval to a number of pieces of all the information within the second time interval as an operation probability of the one of the functions, calculate a probability that, when the one of the functions is operated, another one of the functions has been in operation; and
   output the calculated probability as the analysis result of the causal relationship.

8. The information processing apparatus according to claim 5, wherein the processor is configured to:
   measure latencies for the plurality of operating systems; and exclude an exclusion target time based on a period of time from when a sampling execution instruction is transmitted to the plurality of operating systems to when the latencies elapse, from the totaling target time period and from the generation time period to obtain the first time period and the second time period.

9. An analysis method comprising:

acquiring, by a computer, information capable of identifying functions in operation which is obtained by a sampling by a plurality of operating systems at each first time interval with respect to programs in operation;

totaling a number of samples of the information which are sampled in a first time period which is obtained by subtracting a latency of each operating system from a totaling time period to total the number of samples of the information for each function;

generating time-series data indicating the number of pieces of the information at each second time interval in a second time period which is obtained by subtracting the latency of each operating system from a generation time period to generate the time-series data for the function whose number of pieces of the information satisfies a prescribed condition;

analyzing a causal relationship between the functions based on the time-series data; and outputting an analysis result of the causal relationship between the functions.

* * * * *